US 9,809,244 B2

(12) United States Patent
Tetsuka

(10) Patent No.: US 9,809,244 B2
(45) Date of Patent: Nov. 7, 2017

(54) HOUSING STRUCTURE AND STEERING APPARATUS

(71) Applicant: Showa Corporation, Gyoda-shi (JP)

(72) Inventor: Takayuki Tetsuka, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 78 days.

(21) Appl. No.: 14/861,561

(22) Filed: Sep. 22, 2015

(65) Prior Publication Data

US 2016/0244093 A1    Aug. 25, 2016

(30) Foreign Application Priority Data

Feb. 23, 2015 (JP) ................................. 2015-032414

(51) Int. Cl.
| | |
|---|---|
| *B62J 13/00* | (2006.01) |
| *F16D 1/00* | (2006.01) |
| *F16H 57/02* | (2012.01) |
| *B62D 5/04* | (2006.01) |

(52) U.S. Cl.
CPC .......... *B62D 5/0424* (2013.01); *B62D 5/0403* (2013.01)

(58) Field of Classification Search
CPC .. F16P 1/02; F16H 57/035; F16H 7/06; F16H 57/0489; F16H 7/18
USPC .................................................. 474/144, 146
See application file for complete search history.

(56) References Cited

U.S. PATENT DOCUMENTS

| | | | | |
|---|---|---|---|---|
| 438,644 | A | * | 10/1890 | Robertson ........... F16H 57/0415 29/DIG. 84 |
| 576,719 | A | * | 2/1897 | Bonnell .................. F16G 13/04 474/139 |
| 594,694 | A | * | 11/1897 | Humphrey ............ F16H 57/035 474/146 |
| 598,056 | A | * | 1/1898 | Noyes ................... F16H 57/035 474/146 |
| 809,566 | A | * | 1/1906 | Hemleb ................. D05B 69/12 112/220 |
| 980,141 | A | * | 12/1910 | Breed ................... F16H 57/035 474/146 |
| 1,232,881 | A | * | 7/1917 | Zuck et al. ........... F16H 57/035 474/146 |

(Continued)

FOREIGN PATENT DOCUMENTS

JP        2011-042268 A      3/2011

*Primary Examiner* — Henry Liu
(74) *Attorney, Agent, or Firm* — Leason Ellis LLP

(57) ABSTRACT

A housing structure includes first and second housings and first and second rotation transmitting members. The first and second housings house a shaft. The first rotation transmitting member is provided coaxially with the shaft. The second rotation transmitting member is arranged so as to transmit power to the first rotation transmitting member. The first and second housings are combined with each other so that mating surfaces of the first and second housings that are unparallel to an axis of the shaft are contacted. The first housing includes a first guide portion that protrudes from the mating surface of the first housing. The second housing includes a second guide portion that engages with the first guide portion. The first and second guide portions are engaged with each other along a circumferential direction of the axis and guide relative rotation of the first housing and the second housing around the axis.

13 Claims, 10 Drawing Sheets

(56) References Cited

U.S. PATENT DOCUMENTS

| | | | | |
|---|---|---|---|---|
| 1,762,034 A * | 6/1930 | Silberberger | | F16H 7/06 |
| | | | | 474/140 |
| 1,788,992 A * | 1/1931 | Ecabert | | F16H 7/06 |
| | | | | 184/15.1 |
| 2,154,045 A * | 4/1939 | Herrington | | B60K 17/3505 |
| | | | | 180/248 |
| 2,315,317 A * | 3/1943 | Copp | | F16H 57/027 |
| | | | | 415/90 |
| 2,537,120 A * | 1/1951 | Collis | | F16H 7/06 |
| | | | | 384/206 |
| 2,607,241 A * | 8/1952 | Peterson | | F16P 1/02 |
| | | | | 474/146 |
| 2,613,544 A * | 10/1952 | Cullman | | F16H 7/06 |
| | | | | 474/146 |
| 2,674,896 A * | 4/1954 | Arones | | A47L 11/162 |
| | | | | 15/49.1 |
| 2,695,528 A * | 11/1954 | Bernhard | | B62D 55/08 |
| | | | | 474/134 |
| 2,724,976 A * | 11/1955 | Cartlidge | | F16H 7/06 |
| | | | | 474/111 |
| 2,766,634 A * | 10/1956 | Frank | | F16F 7/00 |
| | | | | 474/140 |
| 2,783,654 A * | 3/1957 | Carnell | | B60R 17/00 |
| | | | | 180/53.1 |
| 3,065,811 A * | 11/1962 | Parrett | | B60K 17/04 |
| | | | | 180/217 |
| 3,811,340 A * | 5/1974 | Morse | | F16P 1/02 |
| | | | | 144/48.3 |
| 3,885,471 A * | 5/1975 | Morine | | F16P 1/02 |
| | | | | 474/144 |
| 3,915,252 A * | 10/1975 | Datta | | F16H 57/05 |
| | | | | 180/24.05 |
| 3,927,578 A * | 12/1975 | Mattila | | F16P 1/02 |
| | | | | 474/146 |
| 4,086,821 A * | 5/1978 | Saxon | | F16H 7/06 |
| | | | | 474/136 |
| 4,850,314 A * | 7/1989 | Villa | | F16H 7/24 |
| | | | | 123/90.31 |
| 4,940,446 A * | 7/1990 | Inui | | B60K 17/22 |
| | | | | 474/144 |
| 6,244,387 B1 * | 6/2001 | Paluncic | | F16N 25/02 |
| | | | | 184/105.1 |
| 6,338,688 B1 * | 1/2002 | Minami | | F16H 57/029 |
| | | | | 474/144 |
| 6,402,137 B1 * | 6/2002 | Gunschera | | B41F 21/08 |
| | | | | 198/803.7 |
| 6,435,994 B1 * | 8/2002 | Friedmann | | F16H 7/18 |
| | | | | 474/111 |
| 7,153,229 B2 * | 12/2006 | Matsumoto | | B62M 9/126 |
| | | | | 280/261 |
| 7,281,596 B2 * | 10/2007 | Fukuda | | F16H 57/0415 |
| | | | | 180/376 |
| 7,686,123 B2 * | 3/2010 | Ishida | | B62K 11/04 |
| | | | | 180/219 |
| 7,757,816 B2 * | 7/2010 | Bar | | F16H 57/0434 |
| | | | | 184/6.12 |
| 7,771,299 B2 * | 8/2010 | Mochizuki | | F16H 9/18 |
| | | | | 180/229 |
| 7,874,951 B2 * | 1/2011 | Leiss | | F04B 17/06 |
| | | | | 474/144 |
| 7,951,031 B2 * | 5/2011 | Hioki | | B62J 13/04 |
| | | | | 123/198 E |
| 8,021,289 B2 * | 9/2011 | Vastola | | B04B 1/20 |
| | | | | 494/29 |
| 8,317,644 B1 * | 11/2012 | Bolch | | B62J 13/04 |
| | | | | 150/167 |
| 8,337,346 B2 * | 12/2012 | Kochidomari | | B60K 17/08 |
| | | | | 180/366 |
| 8,790,200 B2 * | 7/2014 | Boissonneault | | F16H 57/035 |
| | | | | 474/146 |
| 9,140,340 B2 * | 9/2015 | Lai | | F16H 57/0416 |
| 2001/0029215 A1 * | 10/2001 | Ohyama | | B62M 7/12 |
| | | | | 474/148 |
| 2003/0026721 A1 * | 2/2003 | Moroi | | F04C 18/0284 |
| | | | | 418/55.2 |
| 2003/0224890 A1 * | 12/2003 | Nagai | | F16H 7/023 |
| | | | | 474/144 |
| 2004/0043854 A1 * | 3/2004 | Fraley, Jr. | | B62D 5/0424 |
| | | | | 474/134 |
| 2006/0199690 A1 * | 9/2006 | Gardner | | B62J 13/00 |
| | | | | 474/144 |
| 2008/0121455 A1 * | 5/2008 | Ishida | | F16H 57/0489 |
| | | | | 180/219 |
| 2008/0314676 A1 * | 12/2008 | Ishida | | B62K 11/04 |
| | | | | 180/366 |
| 2011/0139113 A1 * | 6/2011 | Miller | | F02F 1/16 |
| | | | | 123/193.3 |
| 2011/0224040 A1 * | 9/2011 | Boissonneault | | F16H 57/035 |
| | | | | 474/146 |
| 2013/0090198 A1 * | 4/2013 | Itoo | | F16H 57/03 |
| | | | | 474/93 |

* cited by examiner

HOUSING STRUCTURE AND STEERING APPARATUS

CROSS-REFERENCE TO RELATED APPLICATIONS

This application is based on and claims priority under 35 USC 119 from Japanese Patent Application No. 2015-032414 filed on Feb. 23, 2015, the entire content of which is incorporated herein by reference.

BACKGROUND OF THE INVENTION

1. Field of the Invention

The present invention relates to a housing structure and a steering apparatus.

2. Description of the Related Art

An assist torque mechanism for a power steering apparatus is available which transmits a torque generated by a motor to a rack shaft via a belt transmission mechanism and a ball screw (see, for example, Japanese Patent Application Laid-open No. 2011-42268). The rack shaft, the belt transmission mechanism, and the ball screw are housed inside a housing divided into two parts in an extending direction of the rack shaft, in other words, a housing divided into two parts in a lateral direction.

The rack shaft is supported by each of the right and left divisional housings. Therefore, the housings need to be precisely combined together so as to accurately center the rack shaft with respect to both housings. Examples of conventional structures that allow the housings to be precisely combined together are depicted in FIG. 9A and FIG. 9B. In the structure depicted in FIG. 9A, over an inner fitting portion 83 formed at an opening edge of a housing 81, an outer fitting portion 84 formed at an opening edge of another housing 82 is externally fitted. A seal member 85 is interposed between the inner fitting portion 83 and the outer fitting portion 84 to prevent water from infiltrating into the housing.

In the structure depicted in FIG. 9B, a plurality of positioning pins 86 is interposed between a mating surface 87 of the housing 81 and a mating surface 88 of the housing 82. The seal member 85 is interposed between the mating surface 87 and the mating surface 88. This structure eliminates the need for a fitting structure for the inner fitting portion 83 and the outer fitting portion 84 in contrast to the structure in FIG. 9A, and allows the housing 81 and the housing 82 to be precisely combined together by bringing the mating surface 87 into abutting contact with the mating surface 88.

[Patent Literature 1] Japanese Patent Application Laid-open No. 2011-42268

However, the structure in FIG. 9A poses the following problems. The housings are shaped generally like an ellipse as viewed in the lateral direction, so as to conform to the arrangement of the belt transmission mechanism housed inside the housings. Therefore, the inner fitting portion 82 and the outer fitting portion 84 formed all along opening edges of the housings 81 and 82 are annularly formed so as to be generally elliptic. Thus, disadvantageously, time and effort are needed for operations to enhance precision, as represented by polishing of the fitting surfaces of the inner fitting portion 82 and the outer fitting portion 84.

The structure in FIG. 9B needs an operation of attaching the pins 86 to the housing 81 or the housing 82, which disadvantageously often needs time and effort. Moreover, pinholes in the housing 81 need to be precisely aligned with pin holes in the hosing 82.

Other conventional problems are as follows. In general, leg portions are formed on the housings 81 and 82 so as allow the housings 81 and 82 to be fixedly fastened to leg seats on a vehicle body. FIG. 10 depicts an example where a first leg portion 91 is formed on the housing 81 and where a second leg portion 92 is formed on the housing 82. In this regard, the two leg seats (not depicted in the drawings) on the vehicle body may be misaligned with each other due to, for example, a manufacture error or an assembly error. In this case, for example, when the first leg portion 91 is attached to one of the leg seats on the vehicle body, the second leg portion 92 may not be aligned with the other leg seat on the vehicle body. This may make attachment of the second leg portion 92 to the other leg portion difficult.

SUMMARY OF THE INVENTION

The present invention has been developed in order to solve these problems. An object of the present invention is to provide a housing structure that facilitates machining of engagement areas of divisional housings and that enables the housings to rotate relative to each other around an axis of a shaft at the time of assembly, and a steering apparatus with the housing structure.

To accomplish this object, the present invention provides a housing structure including a first housing and a second housing that house a shaft, a first rotation transmitting member provided coaxially with the shaft, and a second rotation transmitting member arranged so as to transmit power to the first rotation transmitting member, the first housing and the second housing being combined with each other so that mating surfaces of the first and second housings that are unparallel to an axis of the shaft are contacted with each other, wherein the first housing includes a first guide portion that protrudes from the mating surface of the first housing, the second housing includes a second guide portion that engages with the first guide portion, and the first guide portion and the second guide portion are engaged with each other along a circumferential direction of the axis and guide relative rotation of the first housing and the second housing around the axis.

In the present invention, the first guide portion engages with the second guide portion along the circumferential direction of the axis. This eliminates the need for polishing for an elliptic shape and facilitates machining of the engagement area.

When the first housing and the second housing are provided with respective leg portions that are attached to external leg seats, the first housing and the second housing are rotated relative to each other around the axis to enable the leg portions to be aligned with the leg seats.

The first housing and the second housing rotate using the axis as a center of rotation. Thus, when the shaft is supported both by the first housing and by the second housing, shaft misalignment is unlikely to occur between a support portion of the first housing for the shaft and support portion of the second housing for the shaft.

The present invention is applicable to a steering apparatus in which the shaft is a turning shaft that moves in an axial direction to turn wheels, the second rotation transmitting member is a driving pulley connected to a motor, the first rotation transmitting member is a driven pulley, the first housing includes a first leg portion attached to a vehicle body, and the second housing includes a second leg portion attached to the vehicle body.

The aspect of the present invention facilitates machining of the engagement areas of the divisional housings and enables the housings to rotate relative to each other around the axis of the shaft at the time of assembly, and a steering apparatus with the housing structure.

DESCRIPTION OF THE PREFERRED EMBODIMENTS

Figure 1:
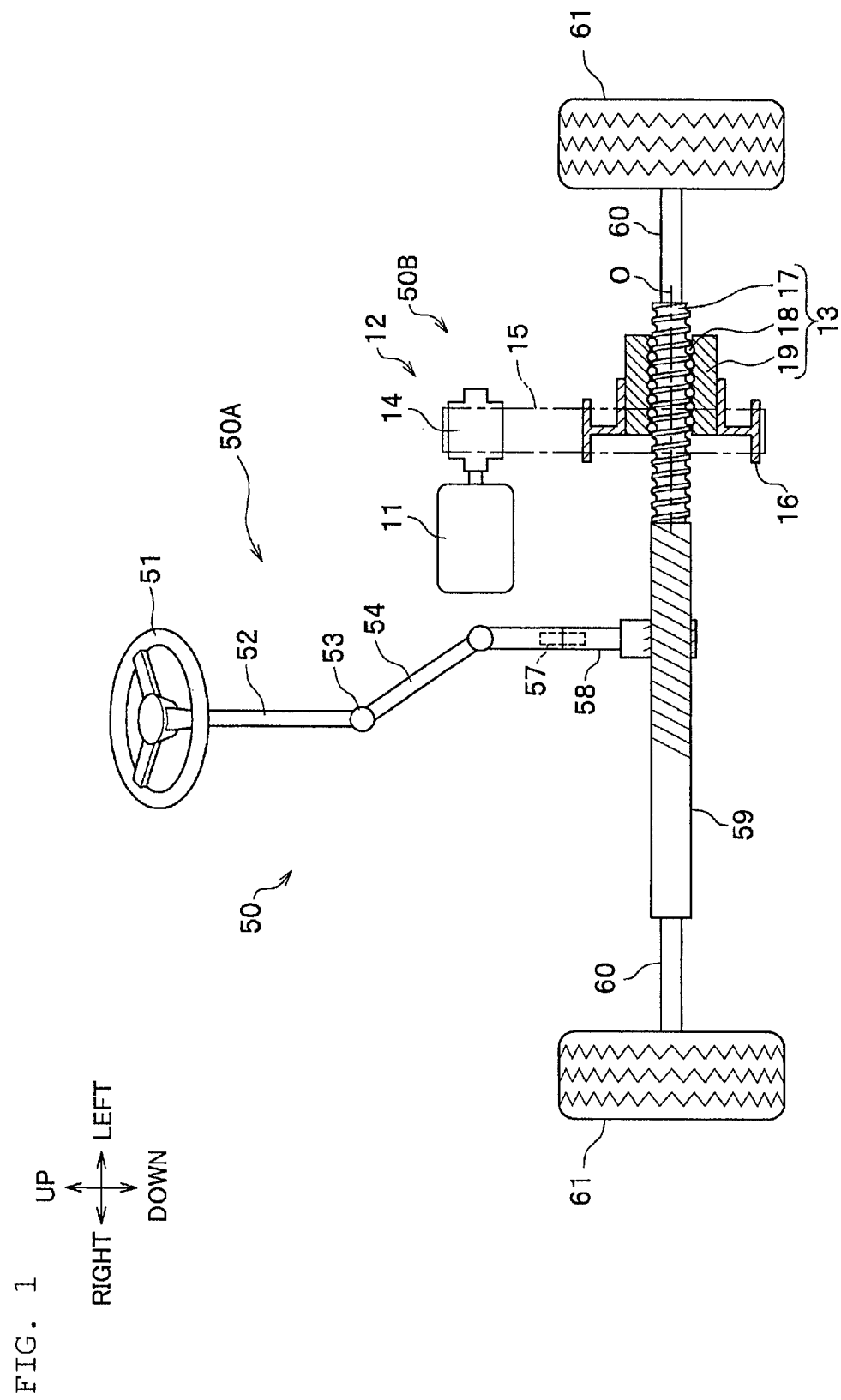
FIG. 1 is a schematic configuration diagram depicting an example of a steering apparatus.

In FIG. 1, a steering apparatus 50 is a rack assist apparatus including a steering mechanism 50A with a rack shaft 59 extending in a lateral direction and an assist torque mechanism 50B arranged at one end of the rack shaft 59.

The steering mechanism 50A includes a steering wheel 51 operated by a driver, a steering shaft 52 that rotates integrally with the steering wheel 51, an upper coupling shaft 54 coupled to the steering shaft 52 via a universal joint 53, a lower coupling shaft 56 coupled to the upper coupling shaft 54 via a universal joint 55, a pinion shaft 58 coupled to the lower coupling shaft 56 via a torsion bar 57 and including a pinion formed on a lower portion of the pinion shaft 58, and the rack shaft 59 provided with rack teeth that mesh with the pinion and to which a right and a left front wheels 61 are coupled via tie rods 60 at opposite ends of the rack shaft 59. When the driver rotates the steering wheel 51, the rack shaft 59 moves rightward or leftward to steer the front wheels 61.

The assist torque mechanism 50B includes a motor 11, a belt transmission mechanism 12, and a ball screw 13. In the assist torque mechanism 50B, a torque applied to the steering wheel 51 is detected by a torque sensor not depicted in the drawings, and according to the detected torque, a control apparatus not depicted in the drawings controllably drives the motor 11. Thus, a torque generated by the motor 11 is transmitted to the rack shaft 59 via the belt transmission mechanism 12 and the ball screw 13 as an assist force for the driver's operating force applied to the steering wheel 51.

An embodiment will be described in which the present invention is applied to a housing that houses the belt transmission mechanism 12, the ball screw 13, and the rack shaft 59.

First Embodiment

Figure 2:
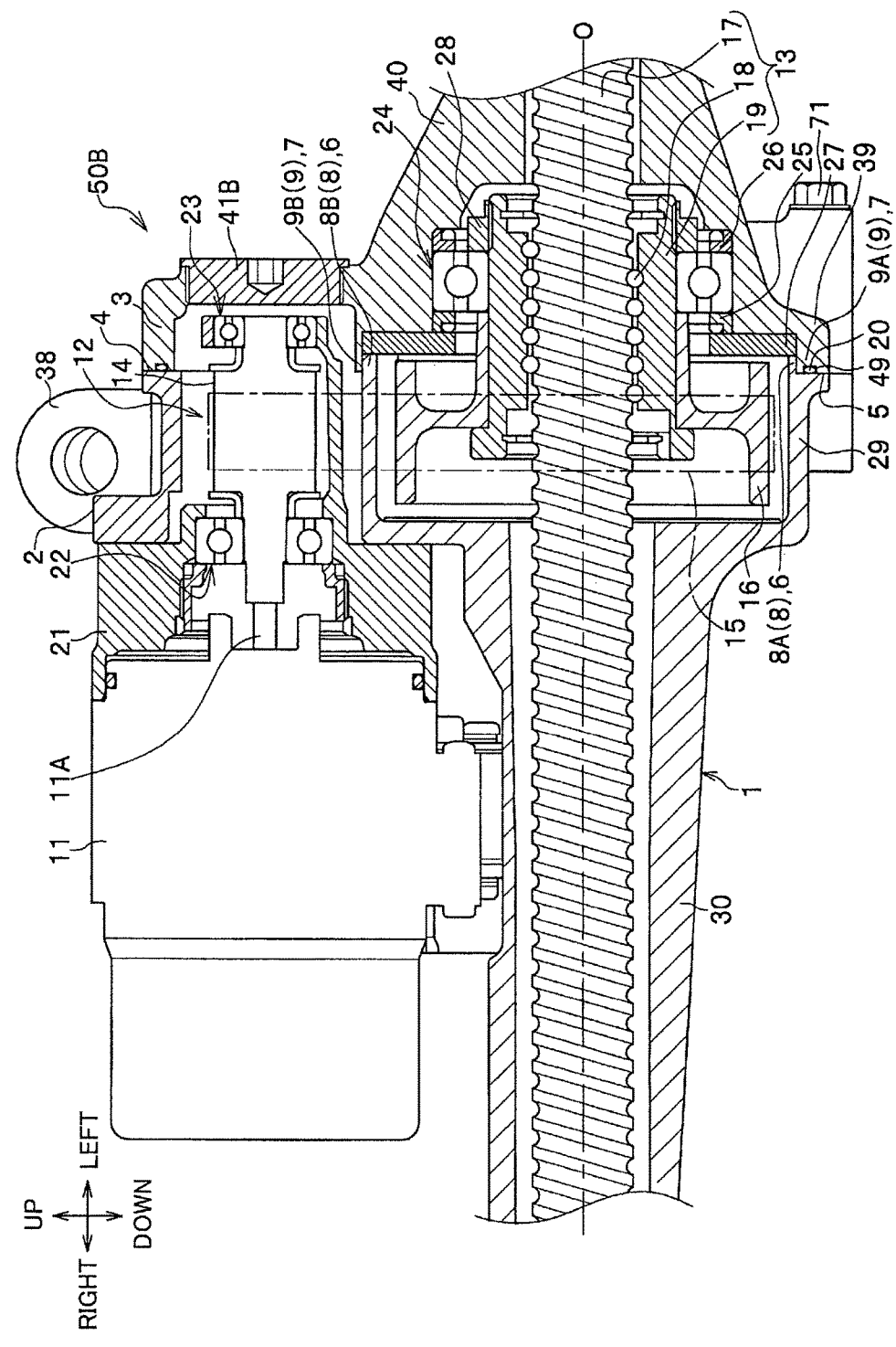
FIG. 2 is a sectional view of a housing structure in a first embodiment.

In FIG. 2, a housing 1 is a housing member that houses the rack shaft (turning shaft or shaft) 59, a driven pulley 16 (first rotation transmitting member) provided coaxially with the rack shaft 59 and serving as a first pulley, a driving pulley 14 (second rotation transmitting member) as a second pulley arranged to transmit power to the driven pulley 16, a belt 15, and the ball screw 13. The housing 1 includes a first housing 2 and a second housing 3 that are combined with each other so that mating surfaces 4 and 5 of the first and second housings 2 and 3, respectively, that are unparallel to an axis O of the rack shaft 59, are contacted with each other. In the present embodiment, the mating surface 4 of the first housing 2 and the mating surface 5 of the second housing 3 are formed as flat surfaces orthogonal to the an axis O.

Belt Transmission Mechanism 12

The belt transmission mechanism 12 includes the driving pulley 14, the belt 15, and the driven pulley 16. The driven pulley 16 has a larger diameter than the driving pulley 14. The motor 11 is attached via a pulley holder 21 to a right outer surface of an upper part of the first housing 2. The pulley holder 21 is fixed to the first housing 2 with a bolt not depicted in the drawings. The driving pulley 14 is attached to an output shaft 11A of the motor 11 and supported by the pulley holder 21 via a pair of bearings 22 and 23. The driven pulley 16 is attached to a nut 19 of the ball screw 13. The belt 15 is passed between the driving pulley 14 and the driven pulley 16.

Ball Screw 13

A ball Screw 13 includes a threaded shaft 17 coaxially attached to the rack shaft 59, balls 18, and a nut 19. The nut 19 is supported by the second housing 3 via a bearing 24. An outer ring of the bearing 24 is sandwiched between annular spacers 25 and 26 arranged on the right and left, respectively, of the outer ring, with a fixing ring 27 located on the right of and in abutting contact with the spacer 25. As a result, the positioning of the bearing 24 relative to the second housing 3 is implemented in the lateral direction. An inner ring of the bearing 24 is externally fitted over the nut 19. A fixing nut 28 screw-threaded over a left end of the nut 19 is located on the left of and in abutting contact with the inner ring of the bearing 24. This allows the nut 19 to be positioned with respect to the bearing 24 in the lateral direction.

Thus, when the motor 11 is driven, the driven pulley 16 rotates via the belt transmission mechanism 12 to rotate the nut 19 to which the driven pulley 16 is attached. Then, a threading action of the ball screw 13 allows the threaded shaft 17 (rack shaft 59) to move in the direction of the axis O.

First Housing 2

Figure 3:
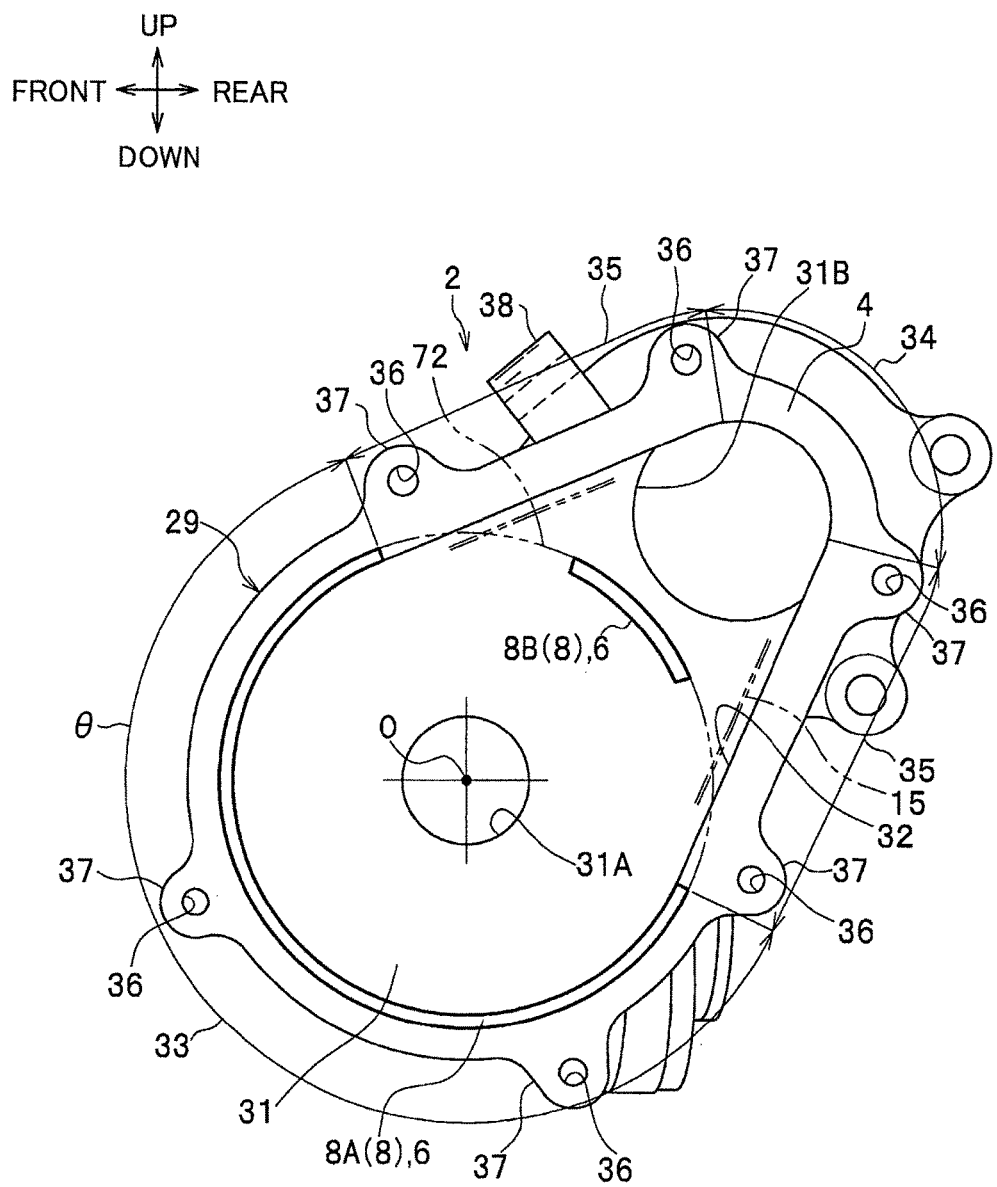
FIG. 3 is a side view of a first housing as viewed in an axial direction of a rack shaft.
Figure 5:
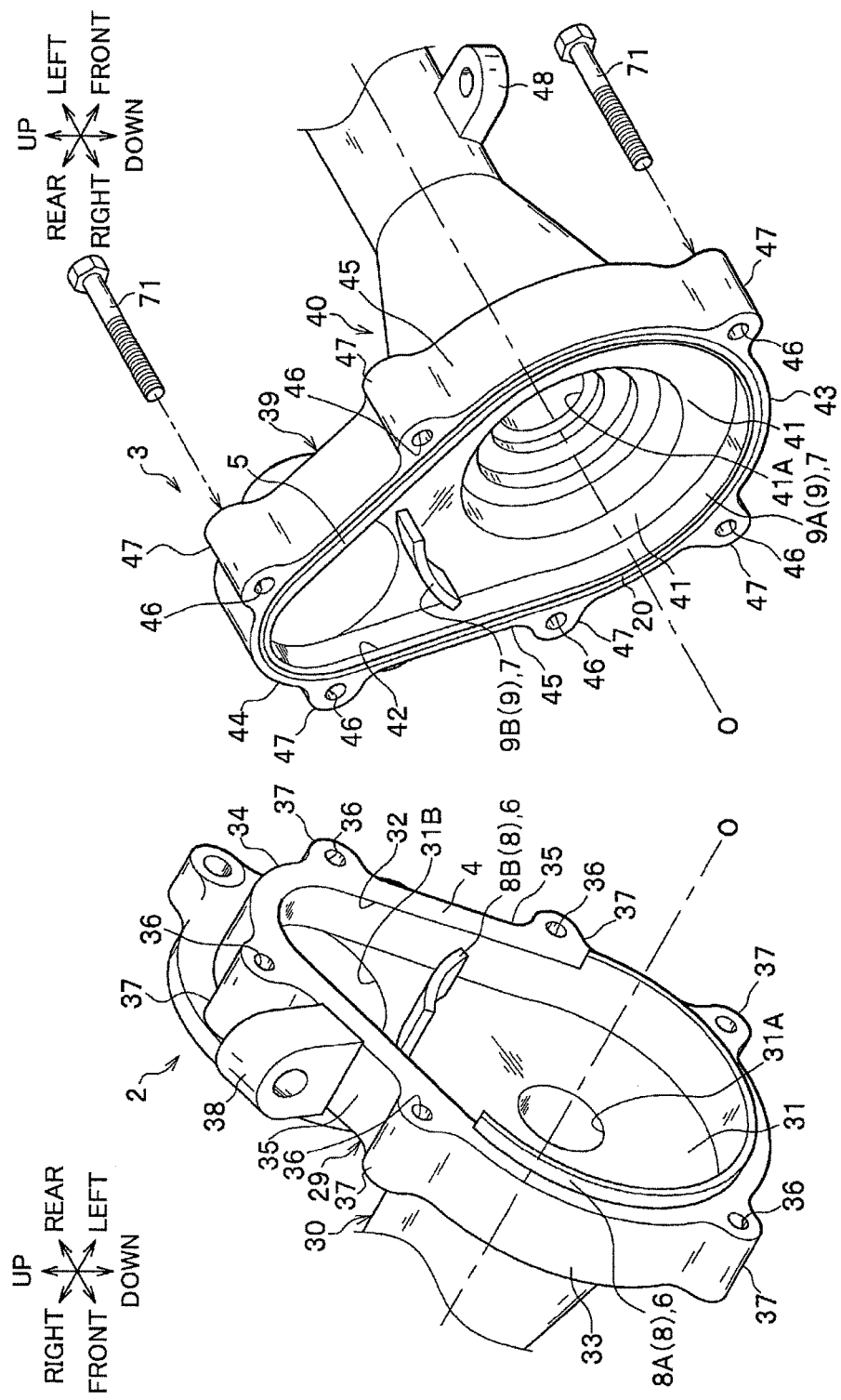
FIG. 5 is a perspective view of the appearance of the first housing and the second housing.

With reference to FIG. 2, FIG. 3, and FIG. 5, the first housing 2 will be described. The first housing 2 includes a power transmission mechanism housing portion 29 that houses the driving pulley 14, the belt 15, the driven pulley 16, and the ball screw 13, and a tubular shaft housing portion 30 that extends rightward from the power transmission mechanism housing portion 29 and through which the rack shaft 59 is inserted. The rack shaft 59 is supported in the shaft housing portion 30 by a bearing member not depicted in the drawings. The power transmission mechanism housing portion 29 is formed along the direction of the axis O. An end wall 31 is formed at a right end of the power transmission mechanism housing portion 29. An opening 32 is formed at a left end of the power transmission mechanism housing portion 29. A left end surface of the power transmission mechanism housing portion 29 that circumscribes the opening 32 forms a mating surface 4. An opening 31A and an opening 31B are formed in the end wall 31 such that the opening 31A is in communication with the shaft housing portion 30 and such that the pulley holder 21 is inserted through the opening 31B.

The power transmission mechanism housing portion 29 appears to be non-circular as viewed in the direction of the axis O as depicted in FIG. 3. Specifically, the power transmission mechanism housing portion 29 is shaped to include a large diameter portion 33 shaped generally like a semicircle around the axis O to house the driven pulley 16 and the ball screw 13, a small diameter portion 34 located above and behind the large diameter portion 33 and shaped generally like a semicircle to house the driving pulley 14, and a pair of linearly shaped intermediate portions 35 formed to bridge the large diameter portion 33 and the small diameter portion 34. The small diameter portion 34 is formed to have a smaller diameter than the large diameter portion 33, and thus, the opposite distance between the intermediate portions 35 decreases from the large diameter portion 33 toward the small diameter portion 34. Therefore, the mating surface 4 is formed as a generally elliptic (oval) flat surface having a pair of linear portions with the distance between the linear portions decreasing in an upward and rearward direction.

A plurality of bolt attachment seats 37 with respective internal thread holes 36 formed therein is formed on an outer surface of the power transmission mechanism housing portion 29. A first leg portion 38 is formed on an outer surface of the upper intermediate portion 35 and applied to a leg seat on the vehicle body (not depicted in the drawings) to fixedly fasten the first housing 2 to the vehicle body.

Second Housing 3

Figure 4:
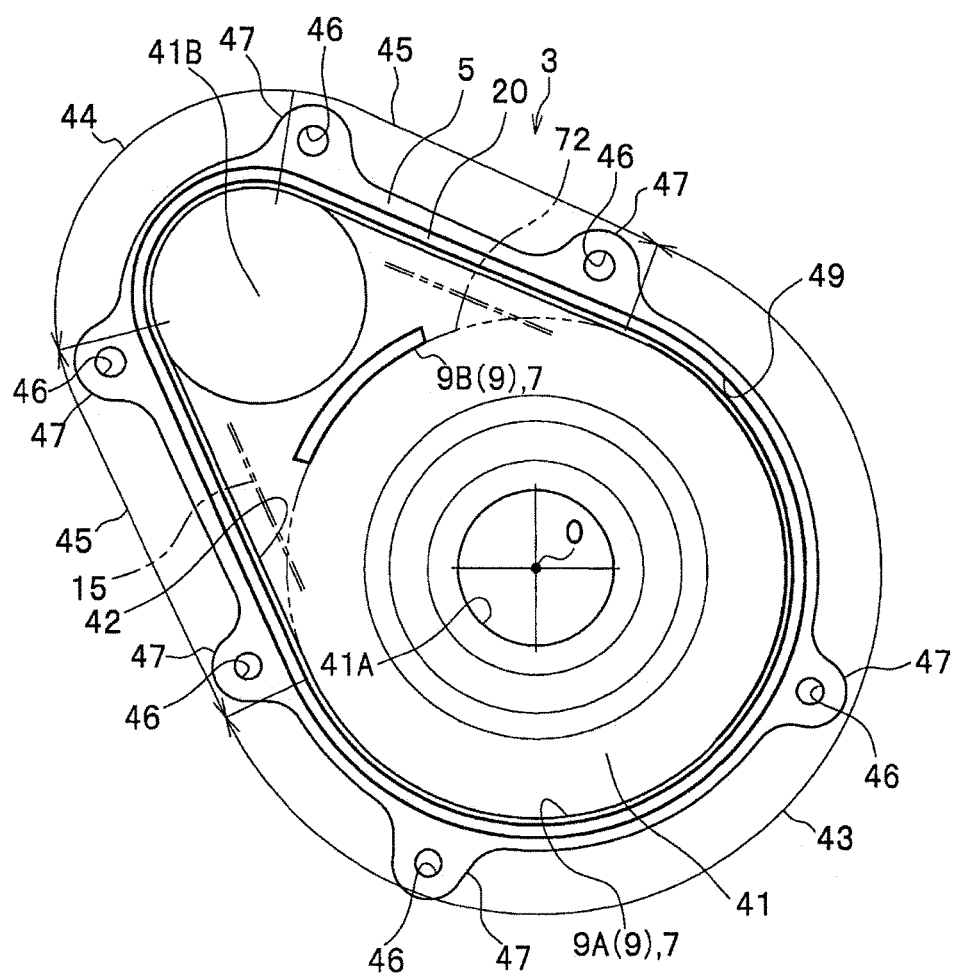
FIG. 4 is a side view of a second housing as viewed in the axial direction of the rack shaft.

With reference to FIG. 2, FIG. 4, and FIG. 5, the second housing 3 will be described. The shapes of the second housing 3 and the first housing 2 are generally symmetric. That is, the second housing 3 includes a power transmission mechanism housing portion 39 that houses the driving pulley 14, the belt 15, the driven pulley 16, and the ball screw 13, and a tubular shaft housing portion 40 that extends leftward from the power transmission mechanism housing portion 39 and through which the rack shaft 59 is inserted. The power transmission mechanism housing portion 39 is formed along the direction of the axis O. An end wall 41 is formed at a left end of the power transmission mechanism housing portion 39. An opening 42 is formed at a right end of the power transmission mechanism housing portion 39. A right end surface of the power transmission mechanism housing portion 39 that circumscribes the opening 42 forms a mating surface 5. An opening 41A that is in communication with the shaft housing portion 40 is formed in the end wall 41. A cap 41B is attached to the end wall 41.

The power transmission mechanism housing portion 39 is shaped to include a large diameter portion 43 shaped generally like a semicircle around the axis O to house the driven pulley 16 and the ball screw 13, a small diameter portion 44 located above and behind the large diameter portion 43 and shaped generally like a semicircle to house the driving pulley 14, and a pair of linearly shaped intermediate portions 45 formed to bridge the large diameter portion 43 and the small diameter portion 44. The small diameter portion 44 is formed to have a smaller diameter than the large diameter portion 43, and thus, the opposite distance between the intermediate portions 45 decreases from the large diameter portion 43 toward the small diameter portion 44. Therefore, the mating surface 5 is formed as a generally elliptic (oval) flat surface having a pair of linear portions with the distance between the linear portions decreasing in an upward and rearward direction.

A rectangular seal groove 49 is formed all along the circumference of the mating surface 5. A seal member 20 such as an O ring is fitted in the seal groove 49. The seal member 20 is brought into close contact with the mating surface 4 to accomplish a waterproofing function, a dust control function, and the like in the housing 1.

A plurality of bolt attachment seats 47 with respective through-holes 46 formed therein is formed in an outer surface of the power transmission mechanism housing portion 39 at positions corresponding to the positions of the bolt attachment seats 37 of the first housing 2. Each of the through-holes 46 is formed to be large enough to permit the relative rotation of the first housing 2 and the second housing 3. The first housing 2 and the second housing 3 are fixedly fastened together by passing bolts 71 through the respective through-holes 46 to screw-thread the bolts 71 through the respective internal thread holes 36 as depicted in FIG. 5. A second leg portion 48 is formed on the shaft housing portion 40 and applied to the leg portion (not depicted in the drawings) on the vehicle body to fixedly fasten the second housing 3 to the vehicle body via a bolt (not depicted in the drawings).

First Guide Portion 6 and Second Guide Portion 7

With reference to FIGS. 2 to 6, the first housing 2 has a first guide portion 6 that protrudes into the second housing 3 from the mating surface 4 of the first housing 2. The second housing 3 has a second guide portion 7 that engages with the first guide portion 6. The first guide portion 6 and the second guide portion 7 are engaged with each other along a circumferential direction of the axis O and guide the relative rotation of the first housing 2 and the second housing 3 around the axis O. "Engaging along the circumferential direction of the axis O" means that the engagement area (slidable contact area) between the first guide portion 6 and the second guide portion 7 is continuously present on the circumference around the axis O or is present at intervals.

In the present embodiment, the first guide portion 6 is a plate-like guide rib 8 protruding so as to define a circular arc around the axis O. The second guide portion 7, which serves as guide wall 9, is shaped like a circular arc around the axis O and comes into slidable contact with a peripheral surface (outer peripheral surface 8A) of the guide rib 8.

The guide rib 8 includes a first guide rib 8A and a second guide rib 8B. The guide rib 8A protrudes into the mating surface 4 of the large diameter portion 33. The first guide rib 8A is formed substantially all over the circumference of the large diameter portion 33. An angle θ (FIG. 3) through which the first guide rib 8A is formed around the axis O is larger than 180 degrees. In other words, the first guide rib 8A is formed so as to lie on opposite sides (a range at angle of 180 on one side and another range at an angle of 180 degrees on the other side) across any orthogonal line 73 (FIG. 6) passing through the axis O. The second guide rib 8B protrudes from the end wall 31 so as to lie inside the belt 15 passed around the driving pulley 14 and the driven pulley 16. An outer peripheral surface of the first guide rib 8A and an outer peripheral surface of the second guide rib 8B are positioned on the same circumferential line 72 around the axis O. The outer peripheral surface of the first guide rib 8A comes into engagement and slidable contact with an inner peripheral surface of a first guide wall 9A described below. The outer peripheral surface of the second guide rib 8B comes into engagement and slidable contact with an inner peripheral surface of a second guide wall 9B described below.

A guide wall 9 includes the first guide wall 9A and the second guide wall 9B. The first guide wall 9A is an inner peripheral wall of the large diameter portion 43. The second guide wall 9B protrudes from the end wall 41 so as to lie inside the belt 15 passed around the driving pulley 14 and the driven pulley 16. An inner peripheral surface of the first guide wall 9A and an inner peripheral surface of the second guide wall 9B are positioned on the same circumferential line 72 around the axis O.

Effects

Figure 6:
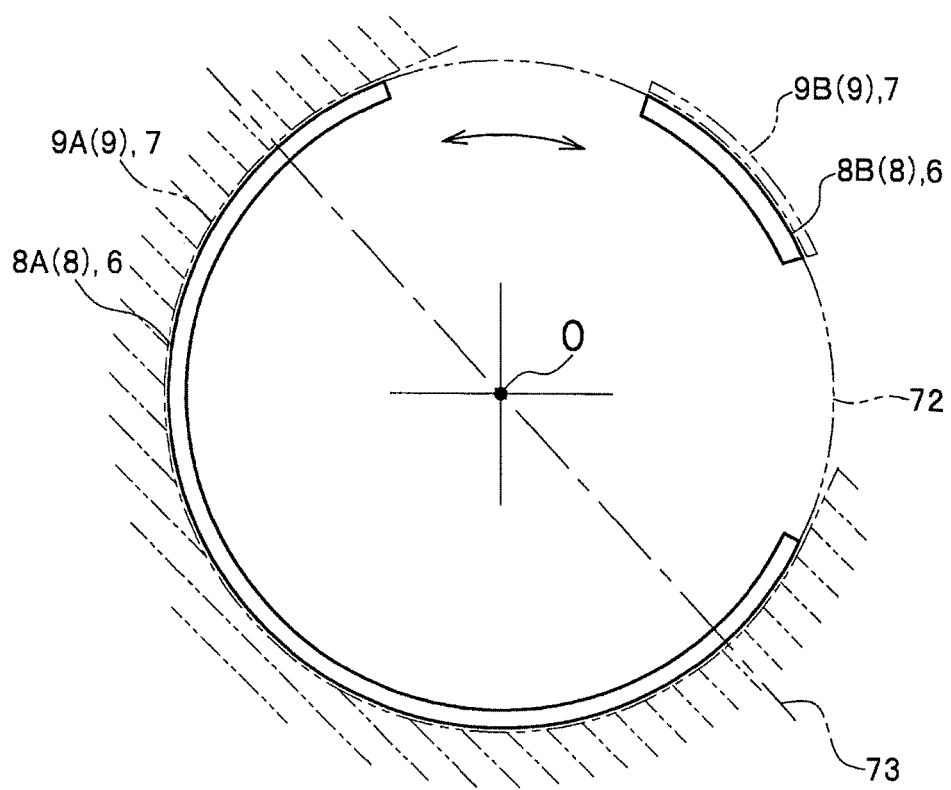
FIG. 6 is a diagram illustrating effects of a first guide portion and a second guide portion as viewed in the axial direction of the rack shaft.

When the first housing 2 and the second housing 3 are combined into the housing 1, the mating surface 4 of the first housing 2 is brought into abutting contact with the mating surface 5 of the second housing 3, and the first housing 2 and the second housing 3 are fixedly fastened together using the bolts 71. At this time, the bolts 71 are loosely tightened, for example. Of course, the bolts 71 may be fully tightened and later loosened when the leg portions are aligned with the leg seats. In the combined first housing 2 and second housing 3, the outer peripheral surface of the first guide rib 8A engages with the inner peripheral surface of the first guide wall 9A, and the outer peripheral surface of the second guide rib 8B engages with the inner peripheral surface of the second guide wall 9B, as depicted in FIG. 6.

When the housing 1 is attached to the vehicle body, an operator applies the first leg portion 38 on the first housing 2 and the second leg portion 48 on the second housing 3 to the respective leg seats on the vehicle body and fixes the leg portions to the leg seats using bolts. Then, if the two leg seats are misaligned with each other due to, for example, a manufacture error or an assembly error (phase shift around the axis O) and one of the first and second leg portions 38 and 48 fails to align with the corresponding leg seat, the operator rotates the first housing 2 and the second housing 3 relative to each other. The first housing 2 and the second housing 3 are rotated relative to each other using the axis O as the center of rotation by bringing the outer peripheral surface of the first guide rib 8A into slidable contact with the inner peripheral surface of the first guide wall 9A and bringing the outer peripheral surface of the second guide rib 8B into slidable contact with the inner peripheral surface of the second guide wall 9B. Thus, both the first leg portion 38 and the second leg portion 48 can be aligned with the respective leg seats. Since the first housing 2 and the second housing 3 rotate using the axis O as the center of rotation, misalignment is unlikely to occur between a support portion (bearing member not depicted in the drawings) for the rack shaft 59 on the first housing 2 side and a support portion (bearing 24) for the rack shaft 59 on the second housing 3 side.

Then, the operator fully tightens the bolts 71 to fixedly fasten the first housing 2 and the second housing 3 together. The interior of the housing 1 is closed by the seal member 20 interposed between the mating surface 4 and the mating surface 5.

Figure 9A:
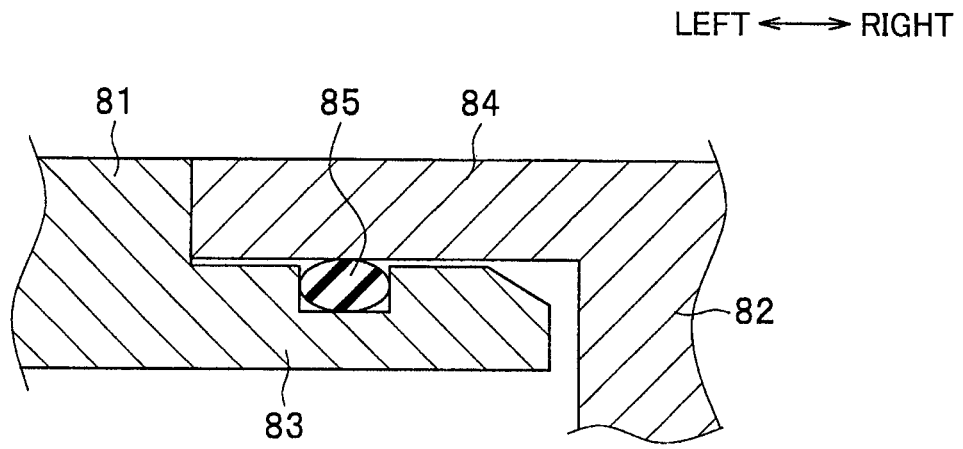
FIG. 9A and FIG. 9B are sectional views of a first conventional example and a second conventional example, respectively, of a housing structure.
Figure 9B:
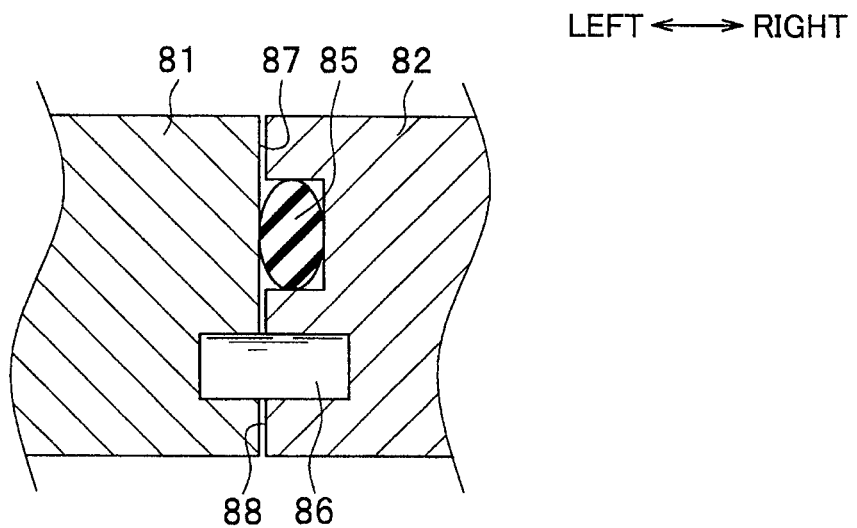
Figure 10:
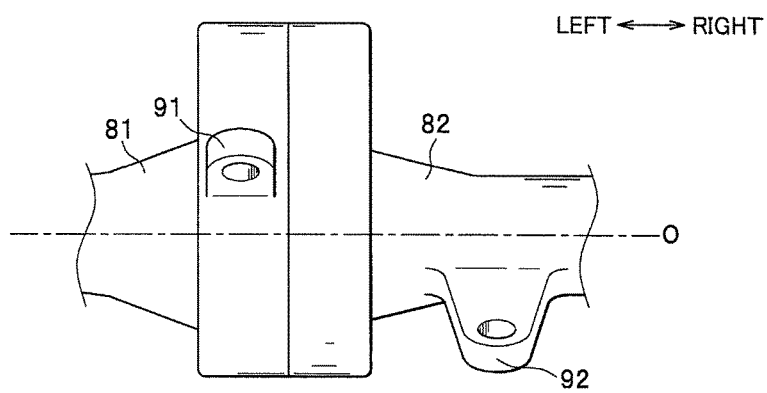
FIG. 10 is a front view of housing on which leg portions are formed.

When the first guide portion 6 engages with the second guide portion 7 along the circumferential direction of the axis O to guide the relative rotation of the first housing 2 and the second housing 3 around the axis O as described above, the following effects are exerted. In a conventional structure in FIG. 9A, an inner fitting portion 82 and an outer fitting portion 84 are annularly formed, and thus, time and effort are disadvantageously needed for operations to enhance precision, as represented by polishing of fitting surfaces of the inner fitting portion 82 and the outer fitting portion 84.

In contrast, in the present invention, the first guide portion 6 engages with the second guide portion 7 along the circumferential direction of the axis O. This eliminates the need for elliptic polishing and facilitates machining of the engagement area.

When the first housing 2 and the second housing 3 are provided with the respective leg portions (first leg portion 38 and second leg portion 48) as is the case with the present embodiment, the first housing 2 and the second housing 3 are rotated relative to each other around the axis O to allow the leg portions to be aligned with the respective leg seats.

Since the first housing 2 and the second housing 3 rotate using the axis O as the center of rotation, when the shaft (rack shaft 59) is supported both by the first housing 2 and by the second housing 3, misalignment is unlikely to occur between the support portion for the rack shaft 59 on the first housing 2 side and the support portion for the rack shaft 59 on the second housing 3 side.

Furthermore, the present invention can be easily implemented when the first rotation transmitting member and the second rotation transmitting member are a first pulley (driven pulley 16) and a second pulley (driving pulley), respectively, with the belt 15 passed between the first pulley and the second pulley. In this case, the first guide portion 6 and the second guide portion 7 can be arranged inside the belt 15 as viewed in the direction of the axis O. This increases the degree of freedom of layout design of the first guide portion 6 and the second guide portion 7.

Moreover, when the first guide portion 6 is the guide rib 8 protruding so as to define a circular arc around the axis O and the second guide portion 7 is the guide wall 9 shaped like a circular arc around the axis O and being in slidable contact with the outer peripheral surface of the guide rib 8, the first guide portion 6 and the second guide portion 7 have simple structures.

When the first guide portion 6 is formed to lie on the opposite sides across any orthogonal line 73 passing through the axis O as in the present embodiment, no misalignment occurs between the first guide portion 6 and the second guide portion 7 in the radial direction of the axis O. Therefore, an operation of combining the first housing 2 and the second housing 3 can be further facilitated.

Second Embodiment

Figure 7:
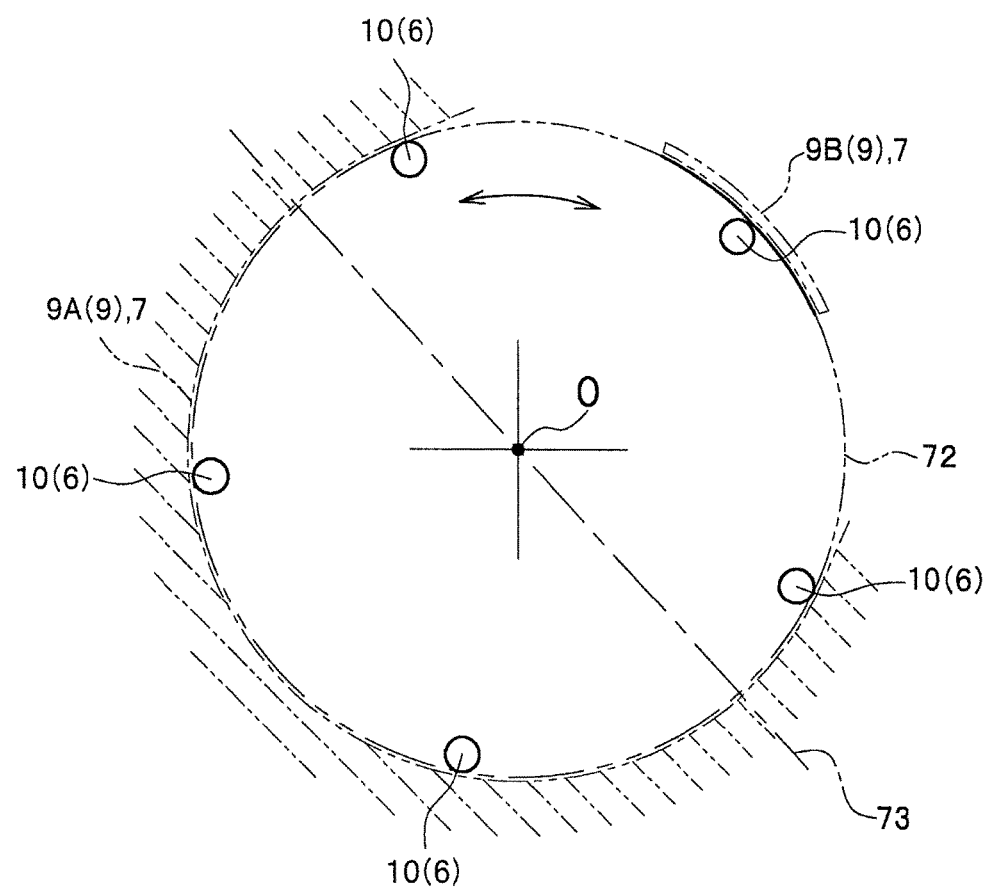
FIG. 7 is a diagram illustrating effects of a first guide portion and a second guide portion as viewed in the axial direction of the rack shaft in a second embodiment.

With reference to FIG. 7, a second embodiment will be described. In the second embodiment, the first guide portion 6 is a plurality of guide pins 10 arranged at intervals in the circumferential direction around the axis O, and the second guide portion 7 is the guide wall 9 shaped like a circular arc around the axis O and being in slidable contact with peripheral surfaces of the guide pins 10. The guide pins 10 protrude from the end wall 31 (FIG. 3). The guide pins 10 may be integrated with the first housing 2 or may be members separate from the first housing 2.

FIG. 7 illustrates an example where five guide pins 10 are arranged in the circumferential direction. Four of the guide pins 10 come into slidable contact with the first guide wall 9A (see also FIG. 4), and the remaining one guide pin 10 comes into slidable contact with the second guide wall 9B. Engagement areas (slidable contact areas) between the guide wall 9 and each of the guide pins 10 are positioned on the circumferential line 72. The five guide pins 10 are in such a relation that the guide pins are arranged on the opposite sides across any orthogonal line 73 passing through the axis O. Therefore, no misalignment occurs between the first guide portion 6 and the second guide portion 7 in the radial direction of the axis O.

Also in the second embodiment, the first housing 2 and the second housing 3 are rotated relative to each other using the axis O as the center of rotation by bringing the guide pins 10 into slidable contact with the inner peripheral surface of the first guide wall 9A or the inner peripheral surface of the second guide wall 9B. Thus, as is the case with the first embodiment, both the first leg portion 38 and the second leg portion 48 can be aligned with the respective leg seats on the vehicle body.

Third Embodiment

Figure 8:
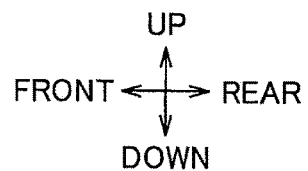
FIG. 8 is a diagram illustrating effects of a first guide portion and a second guide portion as viewed in the axial direction of the rack shaft in a third embodiment.
Figure 8:
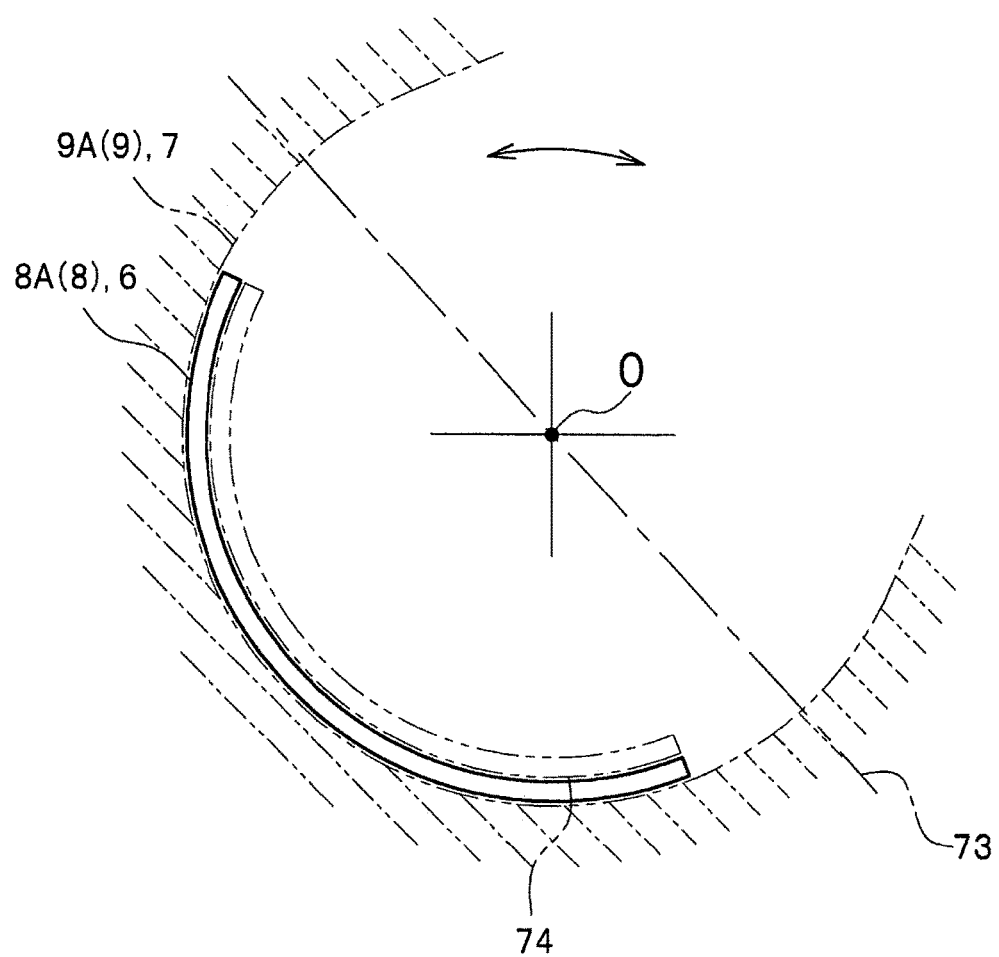

With reference to FIG. 8, a third embodiment will be described. In the third embodiment, a third guide portion 74 is provided such that the first guide portion 6 is sandwiched between the second guide portion 7 and the third guide portion 74 in the radial direction of the axis O. FIG. 8 illustrates a case where the first guide portion 6 is the first guide rib 8A as described in the first embodiment and where the third guide portion 74 is a guide rib shaped like a circular arc and having an outer peripheral surface being in slidable contact with the inner peripheral surface of the first guide rib 8A. The third guide portion 74 protrudes from the end wall 41 (FIG. 4).

In the third embodiment, the first guide portion 6 is sandwiched between the second guide portion 7 and the third guide portion 74 in the radial direction of the axis O. Thus, even when the first guide portion 6 is arranged only on one side of any orthogonal line 73 passing through the axis O, no misalignment occurs between the first guide portion 6 and the second guide portion 7 in the radial direction of the axis O.

Variation

In the above-described embodiments, the first rotation transmitting member and the second rotation transmitting member are pulleys. However, the first rotation transmitting member and the second rotation transmitting member may be gears.

EXPLANATION OF REFERENCE NUMERALS

1 Housing
2 First housing
3 Second housing
4 Mating surface (first housing side)
5 Mating surface (second housing side)
6 First guide portion
7 Second guide portion
8 Guide rib
9 Guide wall
10 Guide pin
11 Driving pulley (second rotation transmitting member or second pulley)
15 Belt
16 Driven pulley (first rotation transmitting member or first pulley)
20 Seal member
38 First leg portion
48 Second leg portion
50 Steering apparatus
59 Rack shaft (turning shaft or shaft)
73 Orthogonal line
O Axis

What is claimed is:

1. A housing structure comprising:
a first housing and a second housing that house a shaft, a first rotation transmitting member provided coaxially with the shaft, and a second rotation transmitting member arranged so as to transmit power to the first rotation transmitting member, the first housing and the second housing being combined with each other so that mating surfaces of the first and second housings that are unparallel to an axis of the shaft are contacted with each other, wherein
the first housing comprises a first guide portion that protrudes from the mating surface of the first housing,
the second housing comprises a second guide portion that engages with the first guide portion,
the first guide portion and the second guide portion are engaged with each other along a circumferential direction of the axis and guide relative rotation of the first housing and the second housing around the axis,
the first guide portion is a guide rib protruding to define a circular arc around the axis, and
the second guide portion is a guide wall having a shape of a circular arc around the axis and being in slidable contact with a peripheral surface of the guide rib.

2. The housing structure according to claim 1, wherein the first rotation transmitting member is a first pulley, and the second rotation transmitting member is a second pulley, with a belt being passed between the first pulley and the second pulley.

3. The housing structure according to claim 2, wherein the first guide portion and the second guide portion are arranged inside the belt as viewed in a direction of the axis.

4. The housing structure according to claim 1, wherein
the first guide portion is a plurality of guide pins arranged at intervals in a circumferential direction around the axis, and
the second guide portion is a guide wall having a shape of a circular arc around the axis and being in slidable contact with peripheral surfaces of the guide pins.

5. The housing structure according to claim 2, wherein
the first guide portion is a plurality of guide pins arranged at intervals in a circumferential direction around the axis, and
the second guide portion is a guide wall having a shape of a circular arc around the axis and being in slidable contact with peripheral surfaces of the guide pins.

6. The housing structure according to claim 3, wherein
the first guide portion is a plurality of guide pins arranged at intervals in a circumferential direction around the axis, and
the second guide portion is a guide wall having a shape of a circular arc around the axis and being in slidable contact with peripheral surfaces of the guide pins.

7. The housing structure according to claim 1, wherein the first guide portion is formed to be on opposite sides across an orthogonal line passing through the axis.

8. The housing structure according to claim 2, wherein the first guide portion is formed to be on opposite sides across an orthogonal line passing through the axis.

9. The housing structure according to claim 3, wherein the first guide portion is formed to be on opposite sides across an orthogonal line passing through the axis.

10. The housing structure according to claim 1, wherein a seal member is interposed between the mating surfaces enclosing the shaft, the first rotation transmitting member, and the second rotation transmitting member as viewed in the direction of the axis.

11. The housing structure according to claim 2, wherein a seal member is interposed between the mating surfaces enclosing the shaft, the first rotation transmitting member, and the second rotation transmitting member as viewed in the direction of the axis.

12. The housing structure according to claim 3, wherein a seal member is interposed between the mating surfaces enclosing the shaft, the first rotation transmitting member, and the second rotation transmitting member as viewed in the direction of the axis.

13. A steering apparatus, having the housing structure according to claim 1, wherein
the shaft is a turning shaft that moves in an axial direction to turn wheels,
the second rotation transmitting member is a driving pulley connected to a motor, and the first rotation transmitting member is a driven pulley, and wherein
the first housing comprises a first leg portion attached to a vehicle body, and
the second housing comprises a second leg portion attached to the vehicle body.

* * * * *